United States Patent
Feng (10) Patent No.: US 12,151,952 B2
(45) Date of Patent: Nov. 26, 2024

(54) METHOD AND APPARATUS FOR PROTECTING ELECTRODE OF CHLORINATOR

(71) Applicant: Ningbo C.F. Electronic Tech Co., Ltd., Zhejiang (CN)

(72) Inventor: Zhongchu Feng, Zhejiang (CN)

(73) Assignee: NINGBO C.F. ELECTRONIC TECH CO., LTD., Zhejiang Province (CN)

( * ) Notice: Subject to any disclaimer, the term of this patent is extended or adjusted under 35 U.S.C. 154(b) by 715 days.

(21) Appl. No.: 17/234,204

(22) Filed: Apr. 19, 2021

(65) Prior Publication Data

US 2021/0300786 A1    Sep. 30, 2021

Related U.S. Application Data (63) Continuation-in-part of application No. PCT/CN2021/074873, filed on Feb. 2, 2021.

(51) Int. Cl.
| | | |
|---|---|---|
| C02F 1/00 | (2023.01) | |
| C02F 1/467 | (2023.01) | |
| C02F 103/42 | (2006.01) | |

(52) U.S. Cl.
CPC ............ *C02F 1/008* (2013.01); *C02F 1/4674* (2013.01); *C02F 2103/42* (2013.01); *C02F 2201/46135* (2013.01); *C02F 2201/4614* (2013.01); *C02F 2201/46145* (2013.01); *C02F 2209/02* (2013.01); *C02F 2209/05* (2013.01)

(58) Field of Classification Search
None
See application file for complete search history.

(56) References Cited

U.S. PATENT DOCUMENTS

| | | | | |
|---|---|---|---|---|
| 5,382,331 | A * | 1/1995 | Banks | G01N 27/38 204/402 |
| 6,238,555 | B1 * | 5/2001 | Silveri | C02F 1/4674 210/243 |
| 2008/0299006 | A1 * | 12/2008 | Ikemizu | C02F 1/4606 422/62 |
| 2018/0143152 | A1 * | 5/2018 | Silveri | G01N 27/06 |
| 2019/0376204 | A1 * | 12/2019 | Stewart | C25B 9/70 |

FOREIGN PATENT DOCUMENTS

| | | | | |
|---|---|---|---|---|
| CN | 104597929 | A * | 5/2015 | |
| CN | 108037697 | A * | 5/2018 | C01B 11/062 |

* cited by examiner

Primary Examiner — Bradley R Spies
Assistant Examiner — Jeannie McDermott
(74) Attorney, Agent, or Firm — Tarolli, Sundheim, Covell & Tummino LLP (57) ABSTRACT

The present invention discloses a method for protecting an electrode of a chlorinator. The method computes a conductivity parameter Fx of the chlorinator and determines whether the working status or the working water environment of the chlorinator is abnormal according to the change of a parameter value of the conductivity parameter Fx, and then the chlorinator executes a protection action according to a determination result to effectively ensure the timeliness for the chlorinator to execute the protection action and reduce the probability of damage of the chlorinator, so as to improve the service life of the chlorinator. The invention also discloses different methods for determining whether the working status or the working water environment of the parameter value is abnormal based on the conductivity parameter Fx, and an apparatus for protecting an electrode of a chlorinator.

20 Claims, 5 Drawing Sheets

METHOD AND APPARATUS FOR PROTECTING ELECTRODE OF CHLORINATOR

RELATED APPLICATIONS

The present invention is a Continuation-in-Part for pending Serial No. PCT/CN2021/074873, filed on 2 Feb. 2021, claiming priority to CN 202010227609.8, filed on 27 Mar. 2020, the entirety of both of which are incorporated herein by reference.

FIELD OF INVENTION

The present invention relates to a method for protecting an electrode of a chlorinator, in particular to a method and apparatus for protecting an electrode of a chlorinator capable of extending the service life of the electrode of the chlorinator.

BACKGROUND OF INVENTION

Description of the Related Art

Chlorinator is widely used in swimming pools to improve the water quality of the swimming pools. However, the water environment of the swimming pools is relatively complicated, and there may be excessive ions such as calcium and magnesium ions in water, so that the water quality cannot meet standard requirements, and the electrode of the chlorinator may be clogged and blocked, and if the clogged electrode of the chlorinator is not cleaned timely, the service life of the electrode will be affected seriously.

Figure 6:
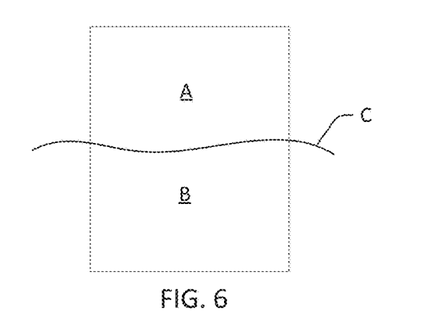
FIG. 6 is a schematic diagram of an electrode of a chlorinator electrode situated in a water shortage environment.

In FIG. 6, A and B represent a cathode and an anode of the electrode of the chlorinator respectively, and C represents the working water level of the chlorinator. In FIG. 6, the electrode A is not dipped in water, indicating that there is a water shortage in the working environment of the chlorinator. When the water shortage or insufficient water flow occurs in the working environment of the chlorinator, gases may be produced in the chlorinator easily, and if these gases cannot be discharged timely, the chlorinator may explode and seriously affect the safety of use of the chlorinator. Meanwhile, the electrode of the chlorinator may also produce water scale due to insufficient water flow. Eventually, the electrode will be clogged, which affects the service life of the electrode.

At present, the continuous working time of most chlorinators on the market is set to 8 hours, but the continuous working time of the chlorinator is generally much longer than 8 hours in practical applications, and the working status may be continued for several days non-stop, and this will seriously affect the service life of the chlorinator.

SUMMARY OF THE INVENTION

Therefore, it is a primary objective of the present invention to provide a method and apparatus for protecting an electrode of a chlorinator to overcome the aforementioned technical problems.

To achieve the aforementioned and other objectives, the present invention discloses a method for protecting an electrode of a chlorinator, and the method executes a protection action according to the water quality of the working water environment of the chlorinator, wherein the method of determining the water quality comprises the following steps.

Step A1: Determine whether the working status of the chlorinator current is reset or reversal; if yes, then wait for a time T5 and then go to step A2, or else go to Step A2 directly.

Step A2: Measure the current value of the electrode of the chlorinator, the voltage value of both terminals of the electrode, and the water temperature of the working water environment of the chlorinator for every predetermined time interval T1.

Step A3: Calculate the parameter value of the conductivity parameter Fx of the electrode of the chlorinator within the time interval T1 based on the data measured in the Step A2.

Step A4: Determine whether the rate of change of the parameter value of the conductivity parameter Fx within a time period T3 exceeds a first threshold.

Step A5: If yes, then the chlorinator will be determined to be having a water quality problem in the working water environment and will be alarmed, and then the chlorinator will be controlled to stop working, or else return to the Step A2 and continue to monitor the data of the working status of the chlorinator and the water temperature of the working water environment.

As a preferred solution of the present invention, the time T5 is greater than 5 minutes, and preferably 15 minutes.

As a preferred solution of the present invention, the first threshold is 5%~15%.

As a preferred solution of the present invention, the chlorinator executes a protection action according to the current salt concentration of the working water environment of the chlorinator in the Step A5, and the method of determining whether or not the salt concentration is abnormal comprises the steps of: determining whether or not the parameter value of the conductivity parameter Fx falling within a predetermined time period before a second threshold is situated at a continuous dropping status of the numerical value; if no, then the salt concentration of the current working environment of the chlorinator will be determined to be abnormal and alarmed, and then the chlorinator will be controlled to stop working.

As a preferred solution of the present invention, the chlorinator executes a protection action according to the failure condition of the chlorinator or the fouling condition of the electrode in the Step A5, and the method of determining whether or not the current of the chlorinator fails or the electrode fouls comprises the steps of: determining whether or not the parameter value of the conductivity parameter Fx falling within a predetermined time period before a second threshold is situated at a continuous dropping status of the numerical value; if yes, then the chlorinator will be determined to be having a failure or the electrode will be determined to be having a fouling and will be alarmed, and then the chlorinator will be controlled to stop working.

As a preferred solution of the present invention, the second threshold falls within a value range of 100~2800, and preferably 1800~2800.

As a preferred solution of the present invention, the chlorinator executes a protection action according to the current salt concentration of the working water environment of the chlorinator in the Step A5, and the method of determining whether or not the salt concentration is abnormal comprises the steps of: determining whether or not the difference between the salt concentration of the working water environment of the initially set chlorinator and the currently calculated parameter value of the conductivity parameter Fx exceeds a third threshold, if no, then the salt concentration of the current working environment of the chlorinator will be determined to be abnormal and will be alarmed, and then the chlorinator will be controlled to stop working.

As a preferred solution of the present invention, the chlorinator executes a protection action according to the failure condition of the chlorinator or a fouling condition of the electrode in the Step A5, and the method of determining whether or not the current of the chlorinator fails or the electrode fouls comprises the steps of: determining whether or not the difference between the salt concentration of the working water environment of the initially set chlorinator and the currently calculated parameter value of the conductivity parameter Fx exceeds a third threshold, if yes, then the chlorinator will be determined to be having a failure, or the electrode will be determined to be having a foul, and then the chlorinator will be controlled to stop working.

As a preferred solution of the present invention, the third threshold falls with a value range of 200~2000, and preferably 200~1000.

As a preferred solution of the present invention, whether or not the working environment of the chlorinator has a water shortage according to the water level situation of the working water environment of the chlorinator in the Step A5, and the chlorinator executes a protection action according to a determination result. The method of determining whether or not the working environment of the chlorinator has a water shortage comprises: determining whether or not a parameter value of the conductivity parameter Fx has a rate of change exceeding a fourth threshold within a predetermined time period T2, if yes, then the working environment of the chlorinator will be determined to be having a water shortage and will be alarmed, and then the chlorinator will be controlled to stop working.

As a preferred solution of the present invention, the fourth threshold falls within a value range of 10%~60%, and preferably 20%~40%.

As a preferred solution of the present invention, whether or not the chlorinator is situated in an overload working status is determined according to a current value of a current passing through the electrode of the chlorinator in the Step A5, and the chlorinator executes a protection action according to a determination result, and the method of determining whether or not the chlorinator is situated in the overload working status comprises the steps of determining whether or not the current value of the current passing through the electrode of the chlorinator exceeds a fifth threshold, if yes, then the chlorinator will be determined to be currently situated in the overload working status, and then the chlorinator will be controlled to stop working.

As a preferred solution of the present invention, the fifth threshold falls within a value range of 1A~50A, and preferably 3.5A~7.5A.

As a preferred solution of the present invention, the method of determining whether or not the chlorinator is current situated in a reset status or the electrode of the chlorinator is situated in a reversal status comprises the steps of:

Step C1: determining whether or not the current value of a current passing through the electrode of the chlorinator electrode has an ascending process within a predetermined time period T9, if yes, then the chlorinator will be determined to be currently situated in the reset status or the electrode of the chlorinator will be determined to be currently situated in the reversal status, and go to step C2, or else the chlorinator will be determined to be currently situated in a stable working status; and Step C2: determining whether or not the current direction of the current passing through the electrode of the chlorinator currently measured at a moment is the same as that measured at a previous moment, if yes, then the chlorinator will be determined to be currently situated at the reset status; or else the electrode of the chlorinator will be determined to be currently situated at the reversal status.

As a preferred solution of the present invention, the time period T9≤60, and preferably T9≤15 minutes.

As a preferred solution of the present invention, the time interval T4 of the chlorinator between two successive reversals is greater than 20 minutes.

As a preferred solution of the present invention, if the water temperature of the working water environment of the chlorinator exceeds a water temperature threshold, the chlorinator will be controlled to stop working.

As a preferred solution of the present invention, the water temperature threshold falls within a value range of 10~60° C., and preferably 10~50° C.

As a preferred solution of the present invention, if the working environment water flow status of the chlorinator is abnormal, the chlorinator will be controlled to stop working.

As a preferred solution of the present invention, the water flow status is detected by a water flow sensor to determine whether the water flow status is abnormal.

As a preferred solution of the present invention, the parameter value of the conductivity parameter Fx is obtained by the following formula: computing $$Fx = \frac{c * I * (a - T)}{U^3}$$

where, c is an electrode constant;
a is a constant;
I represents a current value of the current passing through the electrode of the chlorinator electrode;
T represents a temperature of the working water environment of the chlorinator; and
U represents a voltage value of both terminals of the electrode of the chlorinator.

As a preferred solution of the present invention, if the continuous working time of the chlorinator is determined to be greater than 3~12 hours, and preferably greater than 8 hours, the chlorinator will be controlled to stop working.

To achieve the aforementioned and other objectives, the present invention further discloses an apparatus for protecting an electrode of a chlorinator capable of implementing the aforementioned method, characterized in that the apparatus for protecting an electrode of a chlorinator uses a connection and disconnection of a switch between a control box coupled to the chlorinator and the electrode of the chlorinator to control turning on and off the chlorinator respectively, and the apparatus for protecting an electrode of a chlorinator comprises:

a current detection circuit, coupled to a single chip microcomputer, for instantly detecting a current passing through the electrode of the chlorinator, and transmitting the detected current value to the single chip microcomputer;

a voltage detection circuit, coupled to the single chip microcomputer, for instantly detecting a voltage of both terminals of the electrode of the chlorinator, and transmitting the detected voltage value to the single chip microcomputer;

a temperature detection circuit, coupled to the single chip microcomputer, for detecting a water temperature of the working water environment of the chlorinator, and transmitting the data of the detected water temperature to the single chip microcomputer;

a keyboard input circuit, coupled to the single chip microcomputer, and provided for a user to input a control signal to the apparatus for protecting an electrode of a chlorinator or the chlorinator through a keyboard, so that the apparatus for protecting an electrode of a chlorinator or the chlorinator can drive a corresponding circuit to work and carry out a function control according to the control signal received by the single chip microcomputer;

an alarm circuit, coupled to the single chip microcomputer, for producing an alarm according to an alarm signal outputted by the single chip microcomputer when the single chip microcomputer determines that the operation of the chlorinator is abnormal;

a timing circuit, coupled to the single chip microcomputer, for timing the working time of the chlorinator, and sending a timing signal generated by the accumulated working time to the single chip microcomputer; and a display circuit, coupled to the single chip microcomputer, and the apparatus for protecting an electrode of a chlorinator using the display circuit to display working status information of the chlorinator and working status information of the apparatus for protecting an electrode of a chlorinator on a display device;

wherein, the single chip microcomputer is provided for computing each of the received detected data to determine whether or not the working status and the working environment of the chlorinator are abnormal, and using the control of connection and disconnection of the switch to control the ON/OFF of the chlorinator according to a determination result.

The present invention adopts different methods for determining whether or not the working status or the working water environment of the chlorinator is abnormal, and then executes a protection action of the electrode of the chlorinator according to a determination result to achieve the effects of reducing the probability of damage of the chlorinator and improve the service life of the chlorinator significantly.

BRIEF DESCRIPTION OF THE DRAWINGS

The present invention will become clearer in light of the following detailed description of an illustrative embodiment of this invention described in connection with the drawings.

DESCRIPTION OF THE PREFERRED EMBODIMENTS

Exemplary embodiments are illustrated in referenced figures of the drawings. It is intended that the embodiments and figures disclosed herein are to be considered illustrative rather than restrictive.

To facilitate the description of the specific protection process of the method for protecting an electrode of a chlorinator in accordance with the present invention, the specific structure of an apparatus for protecting an electrode of a chlorinator in accordance with an embodiment of the present invention will be provided to implement the method for protecting an electrode of a chlorinator of the invention.

Figure 3:
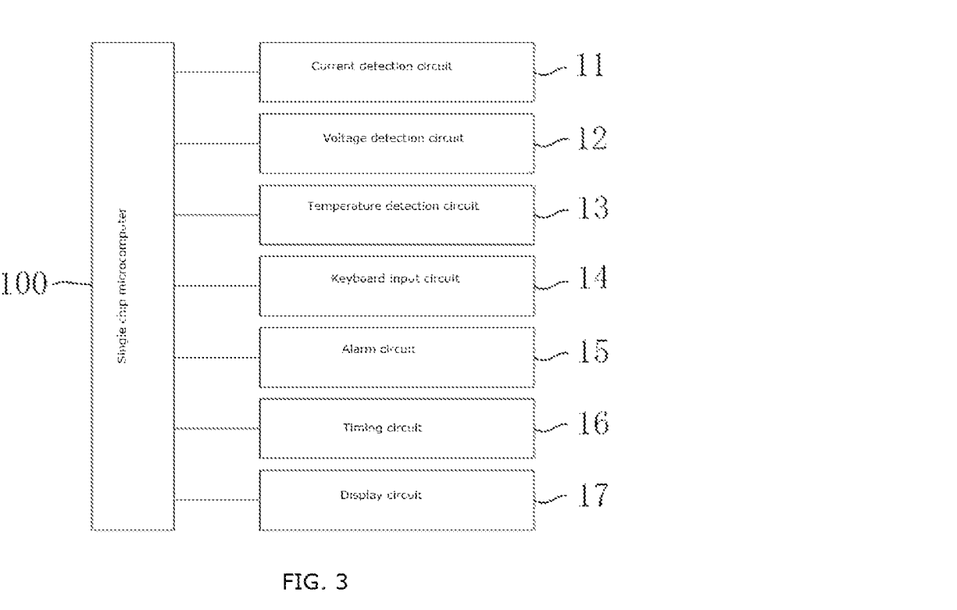
FIG. 3 is a schematic block diagram of an apparatus for protecting an electrode of a chlorinator in accordance with an embodiment of the present invention.
Figure 4:
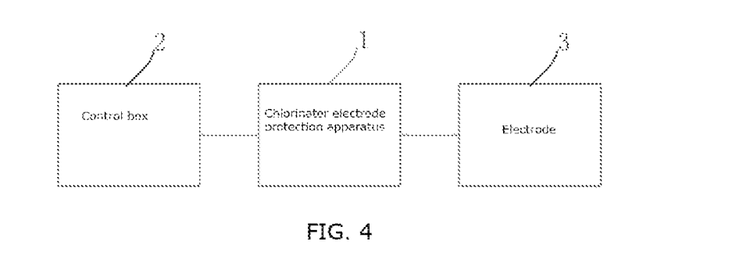
FIG. 4 is a first schematic diagram showing the connection relationship between an apparatus for protecting an electrode of a chlorinator and the chlorinator in accordance with an embodiment of the present invention.
Figure 5:
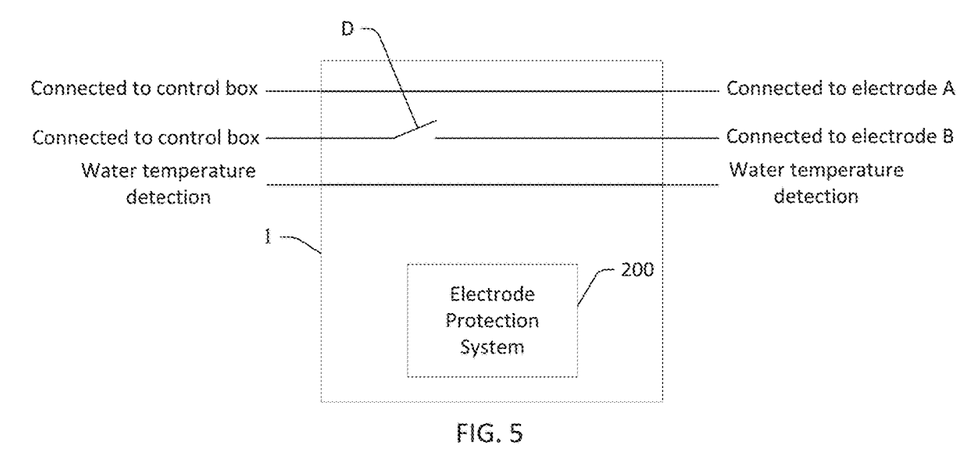
FIG. 5 is a second schematic diagram showing the connection relationship between an apparatus for protecting an electrode of a chlorinator and the chlorinator in accordance with an embodiment of the present invention.

With reference to FIGS. 3, 4, and 5 for an apparatus for protecting an electrode of a chlorinator 1 in accordance with an embodiment of the present invention, the apparatus for protecting an electrode of a chlorinator 1 uses the connection and disconnection of a switch D coupled between a control box 2 and an electrode 3 of the chlorinator to control turning on and off the chlorinator respectively. It is noteworthy that the apparatus for protecting an electrode of a chlorinator 1 in accordance with the present invention can be independent from the control box 2, or integrated into the control box 2. The control box 2 of the chlorinator can control the working status of chlorinator. The apparatus for protecting an electrode of a chlorinator 1 controls the control box 2 of the chlorinator to achieve the control function of the working status of the chlorinator or directly substituting the control box 2 to achieve a direct control of the chlorinator. Specifically, the apparatus for protecting an electrode of a chlorinator 1 in accordance with an embodiment of the present invention as shown in FIG. 3 comprises the following elements:

A current detection circuit 11 is coupled to a single chip microcomputer 100 for instantly detecting a current passing through a cathode or an anode of an electrode 3 of the chlorinator, and transmitting the detected current value to the single chip microcomputer 100. Since there are many conventional current detection circuits with a current detection function, therefore the specific circuit structure of the current detection circuit will not be described here.

A voltage detection circuit 12 is coupled to the single chip microcomputer 100 for instantly detecting a voltage of both terminals (cathode and anode) of the electrode 3 of the chlorinator, and transmitting the detected voltage value to the single chip microcomputer 100. Since there are many conventional voltage detection circuits, therefore the specific circuit structure of the voltage detection circuit will not be described here.

A temperature detection circuit 13 is coupled to the single chip microcomputer 100 for detecting a water temperature of the working water environment of the chlorinator, and transmitting the data of the detected water temperature to the single chip microcomputer 100. Since there are many conventional temperature detection circuits, therefore the specific circuit structure of the temperature detection circuit will not be described here.

A keyboard input circuit 14 is coupled to the single chip microcomputer 100 and provided for a user to input a control signal to the apparatus for protecting an electrode of a chlorinator or the chlorinator through a keyboard, and the single chip microcomputer 100 drives a corresponding circuit (which includes a circuit detection circuit 11 telecommunicatively coupled to the single chip microcomputer 100, a voltage detection circuit 12, a temperature detection circuit 13, an alarm circuit 15, a timing circuit 16 and a display circuit 17, etc.) to work according to the received control signal, so as to achieve a function control of the apparatus for protecting an electrode of a chlorinator or the chlorinator.

An alarm circuit 15 is coupled to the single chip microcomputer 100 for producing an alarm according to an alarm signal outputted by the single chip microcomputer when the single chip microcomputer 100 determines that the operation of the chlorinator is abnormal. Since there are many conventional alarm circuits, therefore the specific circuit structure of the alarm circuit will not be described here.

A timing circuit 16 is coupled to the single chip microcomputer 100 for timing the working time of the chlorinator, and sending a timing signal generated by the accumulated working time to the single chip microcomputer 100. Since there are many conventional timing circuits, therefore the specific circuit structure of the timing circuit will not be described here.

A display circuit 17 is coupled to the single chip microcomputer 100, and the apparatus for protecting an electrode of a chlorinator 1 uses the display circuit 17 to display working status information of the chlorinator and working status information of the apparatus for protecting an electrode of a chlorinator on a display device. Since there are many conventional display circuits, therefore the specific circuit structure of the display circuit will not be described here.

The single chip microcomputer 100 is provided for computing each of the received detected data to determine whether or not the working status and the working environment of the chlorinator are abnormal, and using the control of connection and disconnection of the switch to control the ON/OFF of the chlorinator according to a determination result, so as to prevent the chlorinator from being damaged by being situated in the abnormal working status for a long time.

In the aforementioned technical solution, the single chip microcomputer 100, the current detection circuit 11, the voltage detection circuit 12, the temperature detection circuit 13, the keyboard input circuit 14, the alarm circuit 15, the timing circuit 16 and the display circuit 17 form an electrode protection system 200 of the apparatus for protecting an electrode of a chlorinator 1, and the electrode protection system 200 is packaged in the apparatus for protecting an electrode of a chlorinator 1. It is noteworthy that the electrode protection system 200 can also be directly integrated into the external control box 2. In other words, the electrode protection system 200 can be formed independently from the apparatus for protecting an electrode of a chlorinator 1 or directly integrated into the external control box 2. In addition, the switch D is preferably a conventional relay; the model number of the single chip microcomputer is preferably PIC16F877.

The present invention provides many methods for protecting an electrode of a chlorinator, the contents of some of these methods are described one by one below.

Figure 7:
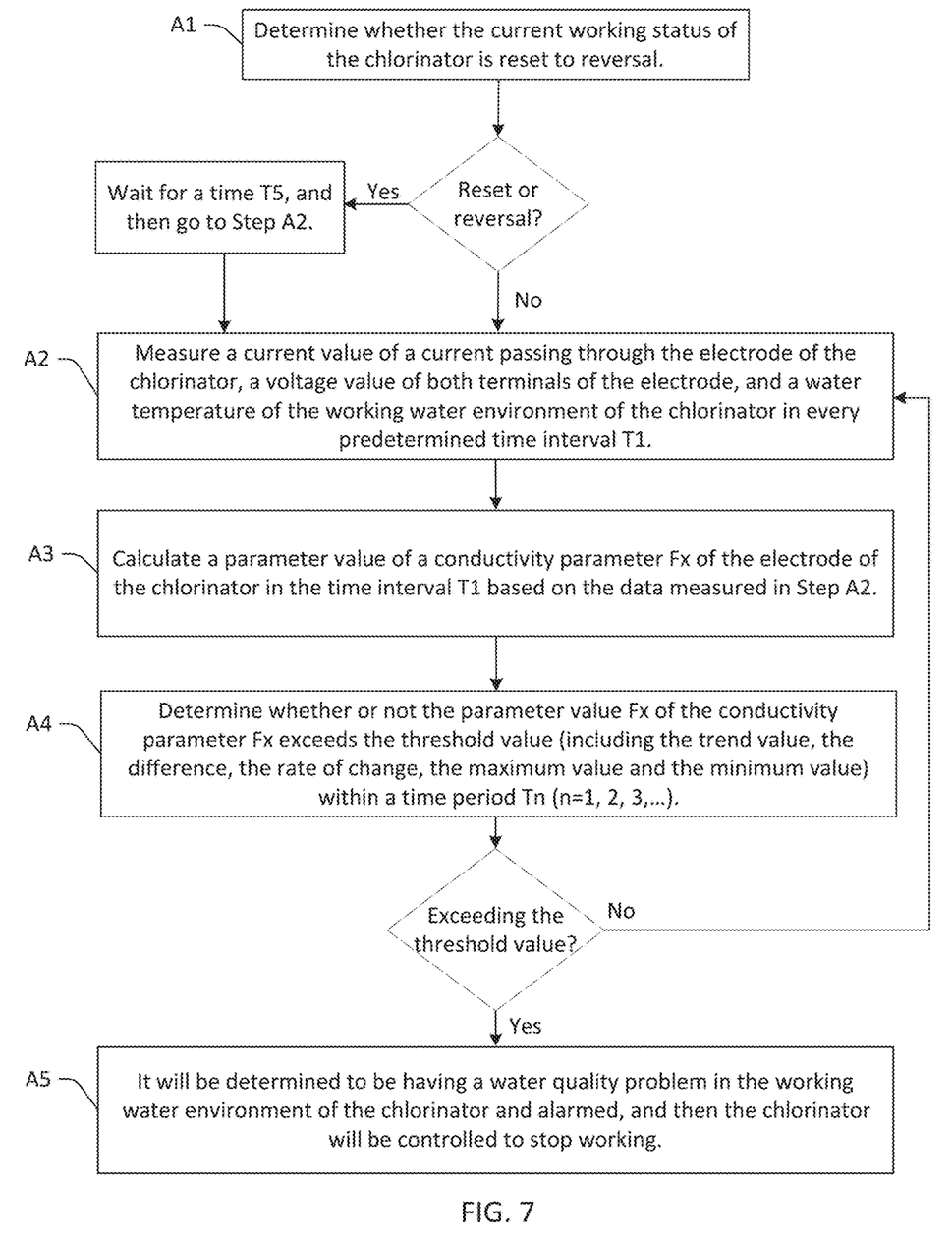
FIG. 7 is a flow chart of a method for protecting an electrode of a chlorinator in accordance with the present invention.

With reference to FIG. 7 for a method for protecting an electrode of a chlorinator in accordance with the present invention, the chlorinator executes a protection action according to a working water environment of the chlorinator, and the method comprises the following steps:

Step A1: Determine whether the working status of the chlorinator current is reset or reversal; if yes, then wait for a time T5 and then go to Step A2, or else go to Step A2 directly.

Step A2: Measure the current value of the electrode of the chlorinator, the voltage value of both terminals of the electrode, and the water temperature of the working water environment of the chlorinator for every predetermined time interval T1.

Step A3: Calculate the parameter value of the conductivity parameter Fx of the electrode of the chlorinator within the time interval T1 based on the data measured in the Step A2.

Step A4: Determine whether the trend value, the difference, the rate of change, the maximum value and the minimum value of the parameter value of the conductivity parameter Fx within a time period Tn (n=1,2,3 . . . ) exceeds a threshold value.

Step A5: If yes, the chlorinator will be determined to be having a water quality problem in the working water environment and will be alarmed, and then the chlorinator will be controlled to stop working, or else return to the Step A2 and continue to monitor the data of the working status of the chlorinator and the water temperature of the working water environment.

Wherein, the threshold can be a trend value, a difference, a rate of change, a maximum value or a minimum value.

First Embodiment

Figure 1:
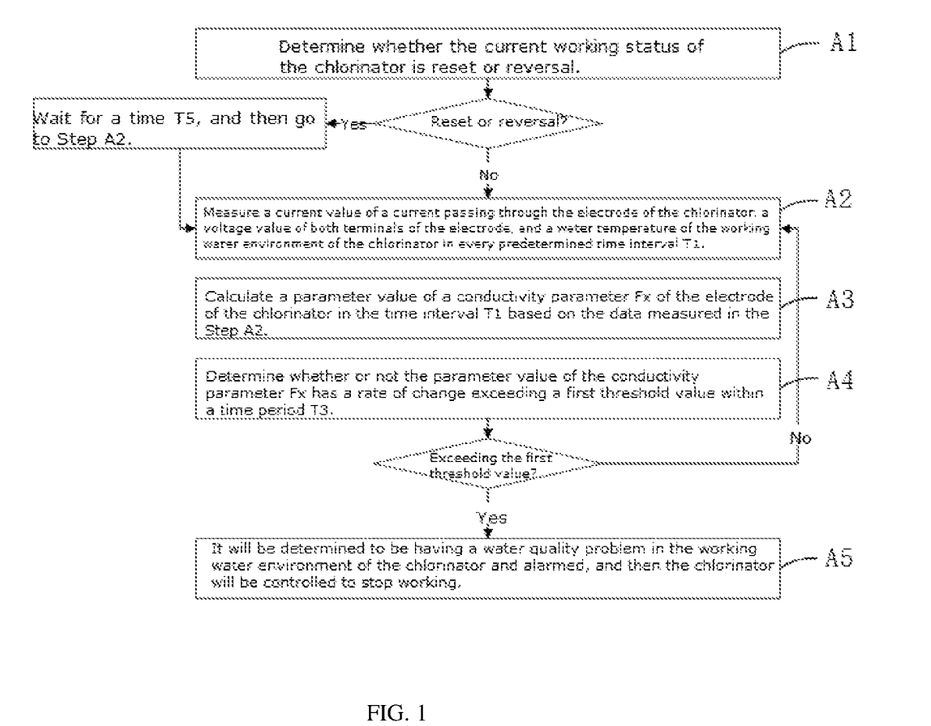
FIG. 1 is a flow chart of a method for protecting an electrode of a chlorinator in accordance with a first embodiment of the present invention.

With reference to FIG. 1 for a method for protecting an electrode of a chlorinator in accordance with an embodiment of the present invention, the chlorinator executes a protection action according to the water quality condition of the working water environment of the chlorinator, and the method of determining the water quality comprises the steps of:

Step A1: determining whether the current working status of the chlorinator is reset or reversal; if yes, then wait for a time T5, and then go to Step A2; or else directly go to Step A2; and Step A2: measuring a current value of a current passing through the electrode of the chlorinator, a voltage value of both terminals of the electrode, and a water temperature of the working water environment of the chlorinator in every predetermined time interval T1.

It should be noted that the current value of a current passing through the electrode and the voltage value of both terminals of the electrode have a dynamic change when the chlorinator is at a reset status or the electrode is at a reversal status, so that the measured current value and voltage value are unstable at that time. If the measured current and voltage data are used to determine whether or not the water quality is abnormal according to the reset status or the reversal status of the chlorinator, a determination result will be undoubtedly inaccurate, so that before the procedure of the method goes to the Step A2, it is necessary to determine if the current working status of the chlorinator is reset or reversal.

Figure 2:
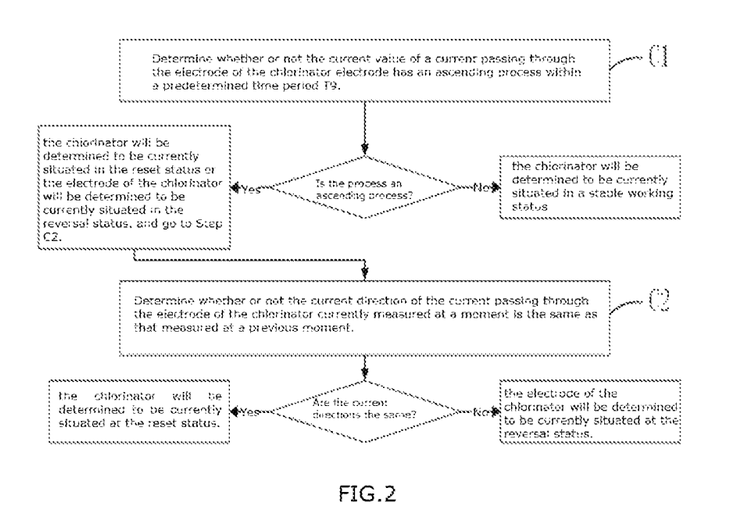
FIG. 2 is a flow chart of a method of determining whether the chlorinator is currently situated at a reset status or whether an electrode of the chlorinator is currently situated at a reversal status in accordance with an embodiment of the present invention.

In FIG. 2, the method of determining whether or not the chlorinator is currently situated at the reset status, or the electrode of the chlorinator is situated at the reversal status, comprises the steps of:

Step C1: determining whether or not the current value of a current passing through the electrode of the chlorinator electrode has an ascending process within a predetermined time period T9, if yes, then the chlorinator will be determined to be currently situated in the reset status or the electrode of the chlorinator will be determined to be currently situated in the reversal status, and go to step C2, or else the chlorinator will be determined to be currently situated in a stable working status; and Step C2: determining whether or not the current direction of the current passing through the electrode of the chlorinator currently measured at a moment is the same as that measured at a previous moment, if yes, then the chlorinator will be determined to be currently situated at the reset status, or else the electrode of the chlorinator will be determined to be currently situated at the reversal status.

Since the reset process of the chlorinator or the reversal process of the electrode generally will not exceed 15 minutes, therefore the time period T9 preferably ≤15 minutes.

In addition, the time interval T1 in the Step A2 (which is the time interval between the current measured time and the previous measured time in the Step C2) is also less than 15 minutes, so that the time interval T1 is reasonably set according to actual needs (such as 3 minutes).

In FIG. 1, the method of determining the water quality further comprises the steps of:

Step A3: calculating a parameter value of a conductivity parameter Fx of the electrode of the chlorinator in the time interval T1 based on the data measured in the Step A2;

Step A4: determining whether or not the parameter value of the conductivity parameter Fx has a rate of change exceeding a first threshold within a time period T3, if yes, then it will be determined to be having a water quality problem in the working water environment of the chlorinator and alarmed, and then the chlorinator will be controlled to stop working (wherein the switch D is controlled to switch off to control the chlorinator to stop working), or else return to the Step A2 to continue monitoring the working status of the chlorinator and the data of the water temperature of the working water environment.

Since the reset process of the chlorinator or the reversal process of the electrode generally will not exceed 15 minutes, therefore the time T5 in the Step A1 is preferably 15 minutes. In other words, if the apparatus for protecting an electrode of a chlorinator determines that the chlorinator is currently in the reset process or the electrode is currently in the reversal process, then the current of the electrode, the voltage of the electrode, and the water temperature of working water environment of the chlorinator should be monitored after waiting for 15 minutes ensure the accuracy of computing the parameter value of the conductivity parameter Fx, so as to improve the accuracy of determining the water quality condition and prevent a wrong control action.

The experiment results show that the time period T3 is preferably 2 hours, and the first threshold preferably falls within a value range of 5%~15%. More preferably, the first threshold is 10%. In other words, if the parameter value of the conductivity parameter Fx has a rate of change exceeding 10% within 2 hours, then it will be determined to be having a water quality problem of the working water environment of the chlorinator.

In the aforementioned technical solution, the parameter value of the conductivity parameter Fx is obtained by computing the following formula:

$$Fx = \frac{c * I * (a - T)}{U^3}$$

where, c is an electrode constant;

a is a constant;

I represents a current value of the current passing through the electrode of the chlorinator electrode;

T represents a temperature of the working water environment of the chlorinator; and U represents a voltage value of both terminals of the electrode of the chlorinator.

Second Embodiment

In the method for protecting an electrode of a chlorinator in accordance with the second embodiment, the chlorinator executes a protection action according to the current salt concentration of the working water environment of the chlorinator, and the method of determining whether or not the salt concentration is abnormal comprises the steps of: determining whether or not the parameter value of the conductivity parameter Fx falling within a predetermined time period before a second threshold is situated at a continuous dropping status of the numerical value; if no, then the salt concentration of the current working environment of the chlorinator will be determined to be abnormal and will be alarmed, and then the chlorinator will be controlled to stop working (wherein the apparatus for protecting an electrode of a chlorinator controls to switch off the switch D, so as to control the chlorinator to stop working).

In the aforementioned technical solution, the second threshold preferably falls within a value range of 1800~2800. More preferably, the second threshold value is 2300. The parameter value of the conductivity parameter Fx falling into the predetermined time period of second threshold is set according to the experiment conditions. For example the predetermined time period is set to 2 hours. In other words, if the parameter value of the conductivity parameter Fx continues dropping to the second threshold within 2 hours, then the salt concentration of the working water environment of the chlorinator will be determined to be abnormal.

What needs to be emphasized is that the determination of an abnormal salt concentration is based on the change of the parameter value of the conductivity parameter Fx. In order to ensure the accuracy of the determination result, the parameter value of the conductivity parameter Fx is also calculated based on the measured data of the current of the electrode, the voltage of the electrode, and the water temperature of the working water environment of the chlorinator after the operation of the chlorinator is stable.

Third Embodiment

The third embodiment provides another method of determining whether or not the current salt concentration of the working water environment of the chlorinator is abnormal. Experiments show that the method of determining whether or not the salt concentration is abnormal provided by the third embodiment is more accurate than that of the second embodiment.

The method of determining whether or not the salt concentration is abnormal in accordance with the third embodiment comprises the steps of: determining whether or not the difference between the salt concentration of the working water environment of the initially set chlorinator and the currently calculated parameter value of the conductivity parameter Fx exceeds a third threshold, if no, then the salt concentration of the current working environment of the chlorinator will be determined to be abnormal and will be alarmed, and then the chlorinator will be controlled to stop working.

According to experiment results, the third threshold preferably falls within a value range of 200~1000. More preferably, the third threshold value is 500.

The salt concentration of the working water environment of the initially set chlorinator is a normal salt concentration of the working water environment of the chlorinator.

Similarly, in order to ensure the accuracy of the determination result, the parameter value of the conductivity parameter Fx is also calculated based on the measured data of the current of the electrode, the voltage of the electrode, and the water temperature of the working water environment of the chlorinator after the operation of the chlorinator is stable.

Fourth Embodiment

In the method for protecting an electrode of a chlorinator in accordance with the fourth embodiment, the chlorinator executes a protection action according to the failure condition of the chlorinator or the fouling condition of the electrode, and the method of determining if the chlorinator is not currently failed or the electrode is not currently fouled comprises the steps of: determining whether or not the parameter value of the conductivity parameter Fx falling within a predetermined time period before a second threshold is situated at a continuous dropping status of the numerical value; if yes, then the chlorinator will be determined to be failed or the electrode will be determined to be fouled, and then the switch D will be controlled to turn off, so as to control the chlorinator to stop working.

In the fourth embodiment, the second threshold preferably falls within a value range of 1800~2800. More preferably, the second threshold value is 2300.

In the fourth embodiment, the predetermined time period is set according to actual experiment conditions. For example, the predetermined time period is set to tens of hours or tens of minutes.

Similarly, in order to ensure the accuracy of the determination result, the parameter value of the conductivity parameter Fx is also calculated based on the measured data of the current of the electrode, the voltage of the electrode, and the water temperature of the working water environment of the chlorinator after the operation of the chlorinator is stable.

Fifth Embodiment

The fifth embodiment further provides another method for protecting an electrode of a chlorinator. Similarly, the chlorinator executes a protection action according to the failure condition of the chlorinator or the fouling condition of the electrode, except that the method of determining if the chlorinator currently fails or the electrode currently fouls comprises the steps of: determining whether or not the difference between the salt concentration of the working water environment of the initially set chlorinator and the currently calculated parameter value of the conductivity parameter Fx exceeds a third threshold, if yes, then the chlorinator will be determined to be failed or the electrode will be determined to be fouled, and then the switch D will be controlled to turn off, so as to control the chlorinator to stop working.

The third threshold preferably falls within a value range of 200~1000. More preferably, the third threshold value is 500.

Similarly, it is noteworthy that the parameter value of the conductivity parameter Fx is also calculated based on the data of the current of the electrode, the voltage of the electrode, and the water temperature of the working water environment of the chlorinator measured in the fifth embodiment after the operation of the chlorinator is stable.

Sixth Embodiment

In the method for protecting an electrode of a chlorinator in accordance with the six embodiment, whether or not the working environment of the chlorinator has a water shortage is determined according to a water level situation of the working water environment of the chlorinator, and the chlorinator executes a protection action according to a determination result, and the method of determining whether or not the working environment of the chlorinator has a water shortage comprises the steps of: determining whether or not a parameter value of the conductivity parameter Fx has a rate of change exceeding a fourth threshold within a predetermined time period T2, if yes, then the working environment of the chlorinator will be determined to be having a water shortage and will be alarmed, and then the chlorinator will be controlled to stop working.

T2 is preferably 3 minutes.

The fourth threshold preferably falls within a value range of 20%~40%. More preferably, the fourth threshold value is 30%. In other words, if the parameter value of the conductivity parameter Fx has a rate of change exceeding 30% within 3 minutes, then the working environment of the chlorinator will be determined to be having a water shortage.

Seventh Embodiment

In the method for protecting an electrode of a chlorinator in accordance with the seventh embodiment, whether or not the chlorinator is situated in an overload working status is determined according to a current value of a current passing through the electrode of the chlorinator, and the chlorinator executes a protection action according to a determination result, and the method of determining whether or not the chlorinator is situated in the overload working status comprises the steps of: determining whether or not the current value of the current passing through the electrode of the chlorinator exceeds a fifth threshold, if yes, then the chlorinator will be determined to be currently situated in the overload working status, and then the switch D will be controlled to turn off to control the chlorinator to stop working, or else the chlorinator will be determined to be not currently situated in the overload working status.

The fifth threshold preferably falls within a value range of 3.5A~7.5A, and the value of the fifth threshold can be set reasonably according to different required work performances of the chlorinator.

Eighth Embodiment

In the method for protecting an electrode of a chlorinator in accordance with the eighth embodiment, the chlorinator executes a protection action according to the water temperature of the working water environment of the chlorinator as described below:

If the water temperature of the working water environment of the chlorinator exceeds a water temperature threshold, then the switch D will be controlled to turn off, so as to control the chlorinator to stop working.

The water temperature threshold preferably falls within a value range of 10~50° C. The value of the water temperature threshold is set according to the required work performance of the chlorinator. For example, some chlorinators can adapt working at a water temperature of 50° C., and thus the water temperature threshold is set to 50° C. Some chlorinators can only work at a water temperature below 30° C., and thus the water temperature threshold is set to 30° C.

Ninth Embodiment

In the method for protecting an electrode of a chlorinator in accordance with the ninth embodiment, the working water environment of the chlorinator is examined to determine whether or not there is an abnormal water flow, in order to take a protection action of the chlorinator.

If a water flow sensor of the apparatus for protecting an electrode of a chlorinator has detected an abnormal water flow of the working water environment of the chlorinator, the apparatus will send an abnormal water flow signal to a single chip microcomputer 100, and the single chip microcomputer 100 will control the according to the switch D to turn off according to the received abnormal water flow signal, so as to control the chlorinator to stop working.

Tenth Embodiment

In the method for protecting an electrode of a chlorinator in accordance with the tenth embodiment, if the continuous working time of the chlorinator is greater than a predetermined continuous working time (such as 8 hours), then the chlorinator will execute a protection action as follows.

For example, if the apparatus for protecting an electrode of a chlorinator detects that the continuous working time of the chlorinator exceeds 8 hours, then the apparatus for protecting an electrode of a chlorinator will control the switch D to turn off, so as to control the chlorinator to stop working.

In the aforementioned technical solution, to improve the calculation accuracy of the parameter value of the conductivity parameter Fx and the accuracy of executing the protection action of the chlorinator protection, the apparatus for protecting an electrode of a chlorinator calculates the average water temperature of the working water environment of the chlorinator within a certain period of time and uses the average water temperature as T in the formula for calculating the conductivity parameter Fx, and calculates the average current value of the current passing through the electrode within the time period and uses the average current value as I in the formula for calculating the conductivity parameter Fx, and calculates the average voltage of both terminals of the electrode within the time period and uses the average voltage as U in the formula for calculating the conductivity parameter Fx.

Specifically, the apparatus for protecting an electrode of a chlorinator detects the water temperature of the working water environment of the chlorinator for several times within the period of time, and the detected water temperatures are T1, T2, T3, . . . , TG, and then the detected minimum temperature and maximum temperature detected in the time period are eliminated, and an average of the remaining water temperature data is calculated to obtain an average water temperature $\Delta T$:

$$\Delta T = \frac{T_1 + T_2 + T_3 + \ldots + T_G - T_{max} - T_{min}}{G-2} \times k \quad \text{Formula (1)}$$

In the formula (1). Tmax stands for the maximum temperature of the apparatus for protecting an electrode of a chlorinator detected in the time period;

Tmin stands for the minimum temperature of the apparatus for protecting an electrode of a chlorinator detected in the time period;

k is a temperature compensation parameter, which is a constant and generally obtained from the summary of many experiment conducted by experimenters; and G is the number of the water temperature data of the apparatus for protecting an electrode of a chlorinator measured in the time period.

Similarly, in the period of time, the average current $\Delta I$ passing through the electrode of the chlorinator is obtained by the following Formula (2):

$$\Delta I = \frac{I_1 + I_2 + I_3 + \ldots + I_G - I_{max} - I_{min}}{G-2} \times m \quad \text{Formula (2)}$$

In the Formula (2), Imax stands for the maximum current value of the apparatus for protecting an electrode of a chlorinator detected in the time period;

Tmin stands for the minimum current value of the apparatus for protecting an electrode of a chlorinator detected in the time period;

m is a current compensation parameter, which is constant and generally obtained from the summary of many experiment conducted by experimenters; and G is the number of the current value of the apparatus for protecting an electrode of a chlorinator measured in the time period.

Within the period of time, an average voltage AU of both terminals of the electrode of the chlorinator is obtained by the following Formula (3):

$$\Delta U = \frac{U_1 + U_2 + U_3 + \ldots + U_G - U_{max} - U_{min}}{G-2} \times n \quad \text{Formula (3)}$$

In the Formula (3), Umax stands for the maximum voltage value of the apparatus for protecting an electrode of a chlorinator detected in the time period;

Umin stands for the minimum voltage value of the apparatus for protecting an electrode of a chlorinator detected in the time period;

n is a voltage compensation parameter; and

G is an apparatus for protecting an electrode of a chlorinator is the number of detected voltage value within the period of time.

The voltage compensation parameter n is a constant, which is generally obtained from the summary of many experiment conducted by experimenters.

It should also be noted that the time interval T4 between two successive reversals of the chlorinator is preferably greater than 20 minutes to ensure that the reversal of the chlorinator has sufficient reversal time.

While the invention has been described by means of specific embodiments, numerous modifications and variations could be made thereto by those skilled in the art without departing from the scope and spirit of the invention set forth in the claims.

What is claimed is:

1. A method for protecting an electrode of a chlorinator, where the chlorinator executes a protection action according to a water quality condition of a working water environment of the chlorinator, the method of determining the water quality condition comprising:
   Step A1: determining whether a current working status of the chlorinator is in a reset status or the electrode of the chlorinator is situated in a reversal status, if yes, then wait for a time T5, and then go to Step A2, or else directly go to Step A2;
   Step A2: measuring a current value of a current passing through the electrode of the chlorinator, a voltage value of both terminals of the electrode, and a water temperature of the working water environment of the chlorinator in every predetermined time interval T1;
   Step A3: calculating a parameter value of a conductivity parameter Fx of the electrode of the chlorinator in the time interval T1 based on a product of an electrode constant, the current, and the temperature subtracted from a constant divided by the voltage cubed of the data measured in the Step A2;
   Step A4: determining whether or not the parameter value of the conductivity parameter Fx has a rate of change exceeding a first threshold within a time period T3; and
   Step 5: when the parameter value of the conductivity parameter Fx has a rate of change exceeding the first threshold within the time period T3, the chlorinator will turn off, or else return to the Step A2 to continue monitoring the working status of the chlorinator and the data of the water temperature of the working water environment.

2. The method for protecting an electrode of a chlorinator as claimed in claim 1, wherein the time T5 is 15 minutes; and the first threshold is 5%~15%.

3. The method for protecting an electrode of a chlorinator as claimed in claim 1, wherein the chlorinator executes a protection action according to a current salt concentration of the working water environment of the chlorinator, and the method of determining whether or not the salt concentration is abnormal comprises the steps of: determining whether or not the parameter value of the conductivity parameter Fx drops to a second threshold within the predetermined time period T3, the second threshold having a different range value than the first threshold; if no, then the salt concentration of the current working environment of the chlorinator will be determined to be abnormal and will be alarmed, and then the chlorinator will be controlled to stop working.

4. The method for protecting an electrode of a chlorinator as claimed in claim 1, wherein the chlorinator executes a protection action according to the failure condition of the chlorinator or the fouling condition of the electrode, and the method of determining whether or not the chlorinator currently fails or the electrode currently fouls comprises the steps of: determining whether or not the parameter value of the conductivity parameter Fx drops to a second threshold within the predetermined time period T3, the second threshold having a different value than the first threshold; if yes, then the chlorinator will be determined to be failed or the electrode will be determined to be fouled, and will be alarmed, and then the chlorinator will be controlled to stop working.

5. The method for protecting an electrode of a chlorinator as claimed in claim 3, wherein the second threshold falls within a value range of 1800~2800.

6. The method for protecting an electrode of a chlorinator as claimed in claim 1, wherein the chlorinator executes a protection action according to the current salt concentration of the working water environment of the chlorinator, and the method of determining whether or not the salt concentration is abnormal comprises the steps of: determining whether or not the difference between the salt concentration of the working water environment of the initially set chlorinator and the parameter value of the conductivity parameter Fx exceeds a third threshold, the third threshold having a different value than the first and second threshold, if no, then the salt concentration of the current working environment of the chlorinator will be determined to be abnormal and will be alarmed, and then the chlorinator will be controlled to stop working.

7. The method for protecting an electrode of a chlorinator as claimed in claim 1, wherein the chlorinator executes a protection action according to the failure condition of the chlorinator or a fouling condition of the electrode, and the method of determining whether or not the current of the chlorinator fails or the electrode fouls comprises the steps of: determining whether or not the difference between the salt concentration of the working water environment of the initially set chlorinator and the parameter value of the conductivity parameter Fx exceeds a third threshold, the third threshold having a different value than the first and second threshold, if yes, then the chlorinator will be determined to be failed, or the electrode will be determined to be fouled, and then the chlorinator will be controlled to stop working.

8. The method for protecting an electrode of a chlorinator as claimed in claim 6, wherein the third threshold falls within a value range of 200~1000.

9. The method for protecting an electrode of a chlorinator as claimed in claim 1, wherein whether or not the working environment of the chlorinator has a water shortage is determined according to a water level situation of the working water environment of the chlorinator, and the chlorinator executes a protection action according to a determination result, and the method of determining whether or not the working environment of the chlorinator has a water shortage comprises the steps of: determining whether or not a parameter value of the conductivity parameter Fx has a rate of change exceeding a fourth threshold within a predetermined time period T2, if yes, then the working environment of the chlorinator will be determined to be having a water shortage and will be alarmed, and then the chlorinator will be controlled to stop working; and the fourth threshold falls within a value range of 20%~40%.

10. The method for protecting an electrode of a chlorinator as claimed in claim 1, wherein whether or not the chlorinator is situated in an overload working status is determined according to a current value of a current passing through the electrode of the chlorinator, and the chlorinator executes a protection action according to a determination result, and the method of determining whether or not the chlorinator is situated in the overload working status comprises the steps of determining whether or not the current value of the current passing through the electrode of the chlorinator exceeds a fifth threshold, if yes, then the chlorinator will be determined to be currently situated in the overload working status, and then the chlorinator will be controlled to stop working.

11. The method for protecting an electrode of a chlorinator as claimed in claim 10, wherein the fifth threshold falls within a value range of 3.5A~7.5A.

12. The method for protecting an electrode of a chlorinator as claimed in claim 1, wherein the method of determining whether or not the chlorinator is current situated in a reset status or the electrode of the chlorinator is situated in a reversal status comprises the steps of:

Step C1: determining whether or not the current value of a current passing through the electrode of the chlorinator electrode has an ascending process within a predetermined time period T9, if yes, then the chlorinator will be determined to be currently situated in the reset status or the electrode of the chlorinator will be determined to be currently situated in the reversal status, and go to step C2, or else the chlorinator will be determined to be currently situated in a stable working status; and Step C2: determining whether or not the current direction of the current passing through the electrode of the chlorinator currently measured at a moment is the same as that measured at a previous moment, if yes, then the chlorinator will be determined to be currently situated at the reset status, or else the electrode of the chlorinator will be determined to be currently situated at the reversal status.

13. The method for protecting an electrode of a chlorinator as claimed in claim 12, wherein the time period T9≤15 minutes; and the time interval T4 of the chlorinator between two successive reversals is greater than 20 minutes.

14. The method for protecting an electrode of a chlorinator as claimed in claim 1, wherein if the water temperature of the working water environment of the chlorinator exceeds a water temperature threshold, the chlorinator will be controlled to stop working; the water temperature threshold falls within a value range of 10~50° C.; if the working environment water flow status of the chlorinator is abnormal, the chlorinator will be controlled to stop working; the water flow status is detected by a water flow sensor to determine whether the water flow status is abnormal.

15. An apparatus for protecting an electrode of a chlorinator, comprising a single chip microcomputer configured to implement the method of claim 1, characterized in that the apparatus for protecting an electrode of a chlorinator uses a connection and disconnection of a switch coupled between a control box and the electrode of the chlorinator to control turning on and off the chlorinator respectively, and the apparatus for protecting an electrode of a chlorinator comprises:

a current detection circuit, coupled to the single chip microcomputer, for instantly detecting a current passing through the electrode of the chlorinator, and transmitting the detected current value to the single chip microcomputer;

a voltage detection circuit, coupled to the single chip microcomputer, for instantly detecting a voltage of both terminals of the electrode of the chlorinator, and transmitting the detected voltage value to the single chip microcomputer;

a temperature detection circuit, coupled to the single chip microcomputer, for detecting a water temperature of the working water environment of the chlorinator, and transmitting the data of the detected water temperature to the single chip microcomputer;

a keyboard input circuit, coupled to the single chip microcomputer, and provided for a user to input a control signal to the apparatus for protecting an electrode of a chlorinator or the chlorinator through a keyboard, so that the apparatus for protecting an electrode of a chlorinator or the chlorinator can drive a corresponding circuit to work and carry out a function control according to the control signal received by the single chip microcomputer;

an alarm circuit, coupled to the single chip microcomputer, for producing an alarm according to an alarm signal outputted by the single chip microcomputer when the single chip microcomputer determines that the operation of the chlorinator is abnormal;

a timing circuit, coupled to the single chip microcomputer, for timing the working time of the chlorinator, and sending a timing signal generated by the accumulated working time to the single chip microcomputer; and a display circuit, coupled to the single chip microcomputer, and the apparatus for protecting an electrode of a chlorinator using the display circuit to display working status information of the chlorinator and working status information of the apparatus for protecting an electrode of a chlorinator on a display device;

wherein, the single chip microcomputer, for computing each of the received detected data to determine whether or not the working status and the working environment of the chlorinator are abnormal, and using the control of connection and disconnection of the switch to control the ON/OFF of the chlorinator according to a determination result.

16. A method for protecting an electrode of a chlorinator, where the chlorinator executes a protection action according to an operation condition of a working water environment of the chlorinator, the method of determining the operation condition comprising:

Step A1: determining whether the current working status of the chlorinator current is reset or reversal; if yes, then wait for a time T5 and then go to Step A2, or else go to Step A2 directly;

Step A2: measuring a current value of the electrode of the chlorinator, a voltage value of both terminals of the electrode, and a water temperature of the working water environment of the chlorinator for every predetermined time interval T1;

Step A3: calculating a parameter value of a conductivity parameter Fx of the electrode of the chlorinator within the time interval T1 based on a product of an electrode constant, the current, and the temperature subtracted from a constant divided by the voltage cubed of the data measured in the Step A2;

Step A4: determining whether a trend value, a difference, a rate of change, a maximum value or a minimum value of the parameter value of the conductivity parameter Fx within a time period Tn exceeds a threshold value; and Step A5: when the parameter value of the conductivity parameter Fx has a rate of change exceeding the first threshold within the time period T3, the chlorinator will turn off, or else return to Step A2 and continue to monitor the data of the working status of the chlorinator and the water temperature of the working water environment.

17. The method for protecting an electrode of a chlorinator as claimed in claim 16, wherein in the Step A5, the chlorinator executes the protection action according to the current salt concentration of the working water environment of the chlorinator, the failure condition of the chlorinator, or the fouling condition of the chlorinator and implement by a first determination method or a second determination method, and the first determination method comprises the steps of: determining whether or not the parameter value of the conductivity parameter FX falling within a predetermined time period before a second threshold is situated at a continuous dropping status of the numerical value; if no, then the salt concentration of the current working environment of the chlorinator will be determined to be abnormal and alarmed, and then the chlorinator will be controlled to stop working, or else the chlorinator will be determined to be having a failure or the electrode will be determined to be having a fouling and will be alarmed, and then the chlorinator will be controlled to stop working; wherein the second threshold value falls within a value range of 100~2800; and the second determination method comprises the steps of: determining whether or not the difference between the salt concentration of the working water environment of the initially set chlorinator and the parameter value of the conductivity parameter Fx exceeds a third threshold, the third threshold having a different value than the first and second threshold, if no, then the salt concentration of the current working environment of the chlorinator will be determined to be abnormal and will be alarmed, and then the chlorinator will be controlled to stop working, or else the chlorinator will be determined to be having a failure or the electrode will be determined to be having a fouling, and then the chlorinator will be controlled to stop working, wherein the third threshold value falls within a value range of 200~2000.

18. The method for protecting an electrode of a chlorinator as claimed in claim 16, wherein whether or not the working environment of the chlorinator has a water shortage is determined according to a water level situation of the working water environment of the chlorinator, and the chlorinator executes a protection action according to a determination result, and the method of determining whether or not the working environment of the chlorinator has a water shortage comprises the steps of: determining whether or not a parameter value of the conductivity parameter Fx has a rate of change exceeding a fourth threshold within a predetermined time period T2, if yes, then the working environment of the chlorinator will be determined to be having a water shortage and will be alarmed, and then the chlorinator will be controlled to stop working, wherein the fourth threshold value falls within a value range of 10%~60%.

19. The method for protecting an electrode of a chlorinator as claimed in claim 16, wherein whether or not the chlorinator is situated in an overload working status is determined according to a current value of a current passing through the electrode of the chlorinator, and the chlorinator executes a protection action according to a determination result, and the method of determining whether or not the chlorinator is situated in the overload working status comprises the steps of determining whether or not the current value of the current passing through the electrode of the chlorinator exceeds a fifth threshold, if yes, then the chlorinator will be determined to be currently situated in the overload working status, and then the chlorinator will be controlled to stop working, wherein the fifth threshold value falls within a value range of 1A~100A.

20. The method for protecting an electrode of a chlorinator as claimed in claim 16, wherein the method of determining whether or not the chlorinator is currently situated in a reset status or the electrode of the chlorinator is currently situated in a reversal status comprises the steps of:

Step C1: determining whether or not the current value of a current passing through the electrode of the chlorinator electrode has an ascending process within a predetermined time period T9, if yes, then the chlorinator will be determined to be currently situated in the reset status or the electrode of the chlorinator will be determined to be currently situated in the reversal status, and go to Step C2, or else the chlorinator will be determined to be currently situated in a stable working status; and Step C2: determining whether or not the current direction of the current passing through the electrode of the chlorinator currently measured at a moment is the same as that measured at a previous moment, if yes, then the chlorinator will be determined to be currently situated at the reset status, or else the electrode of the chlorinator will be determined to be currently situated at a stable operating status the reversal status, and the time period $T9 \leq 60$, and the time interval between two successive reversal time of the electrode of the chlorinator is not less than 20 minutes.

* * * * *